United States Patent
Nellen et al.

(10) Patent No.: US 9,969,246 B2
(45) Date of Patent: May 15, 2018

(54) OPEN ROOF CONSTRUCTION FOR A VEHICLE

(71) Applicant: Inalfa Roof Systems Group B.V., Oostrum (NL)

(72) Inventors: Marcel Johan Christiaan Nellen, Merselo (NL); Rainer Gerhard Jungling, Dusseldorf (DE)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days. days.

(21) Appl. No.: 15/368,193

(22) Filed: Dec. 2, 2016

(65) Prior Publication Data

US 2017/0158036 A1  Jun. 8, 2017

(30) Foreign Application Priority Data

Dec. 4, 2015  (EP) .................................. 15198041

(51) Int. Cl.
| | |
|---|---|
| *B60J 7/047* | (2006.01) |
| *B60J 7/043* | (2006.01) |
| *B60J 7/057* | (2006.01) |
| *B60J 7/19* | (2006.01) |
| *B60J 7/02* | (2006.01) |

(52) U.S. Cl.
CPC ............ *B60J 7/0435* (2013.01); *B60J 7/024* (2013.01); *B60J 7/057* (2013.01); *B60J 7/192* (2013.01)

(58) Field of Classification Search
CPC .................................................. B60J 7/0435
USPC ....................... 296/216.02–216.05
See application file for complete search history.

(56) References Cited

U.S. PATENT DOCUMENTS

| | | | | |
|---|---|---|---|---|
| 4,893,869 | A | * | 1/1990 | Fuerst .................... B60J 7/0435 296/216.03 |
| 6,471,286 | B1 | | 10/2002 | Manders |
| 6,957,851 | B2 | | 10/2005 | Manders |
| 8,322,783 | B2 | | 12/2012 | Manders |
| 2004/0007902 | A1 | | 1/2004 | Manders |

(Continued)

FOREIGN PATENT DOCUMENTS

| | | | |
|---|---|---|---|
| EP | 0638452 | * | 8/1994 |
| WO | 00/06403 A2 | | 2/2000 |
| WO | 2010088951 A1 | | 8/2010 |

OTHER PUBLICATIONS

European Search Report and Written Opinion for European patent application No. EP 15198041.4, dated May 27, 2016.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle having an opening in the fixed roof includes an operating mechanism for a closure element and comprises a driving slide, slidably guided in the guide rail, a front support attached to the closure element, a support lever having a front end and a rear end and which is slidably connected to a panel track of the closure element by a rear sliding member. The support lever is in engagement with said rear guide track by a middle sliding member. The driving slide is configured to drive the support lever at least along part of path of movement of the closure element. The support lever is constructed such that, in an open position of the closure element, the rear sliding member at the rear end of the support lever extends above the fixed roof behind the roof opening.

20 Claims, 7 Drawing Sheets

(56) References Cited

U.S. PATENT DOCUMENTS

2004/0222675 A1    11/2004  Oberheide
2007/0228779 A1*  10/2007  Stallfort ................ B60J 7/0435
                                                                  296/224
2011/0285181 A1    11/2011  Manders

* cited by examiner

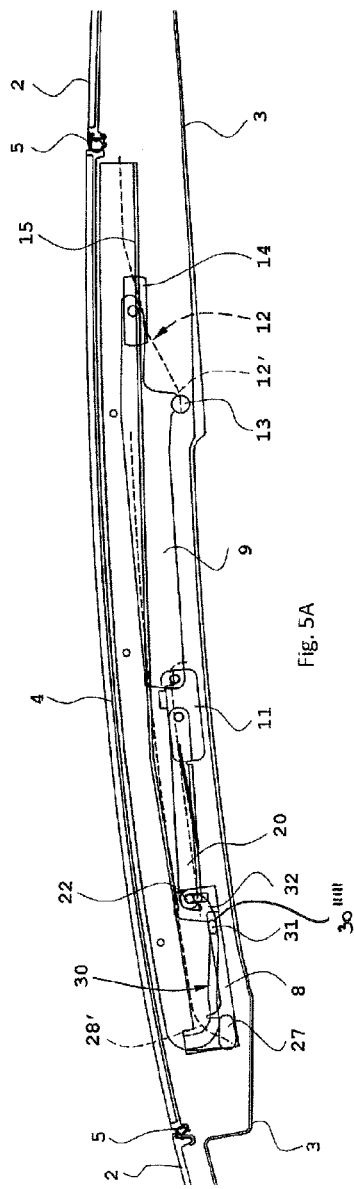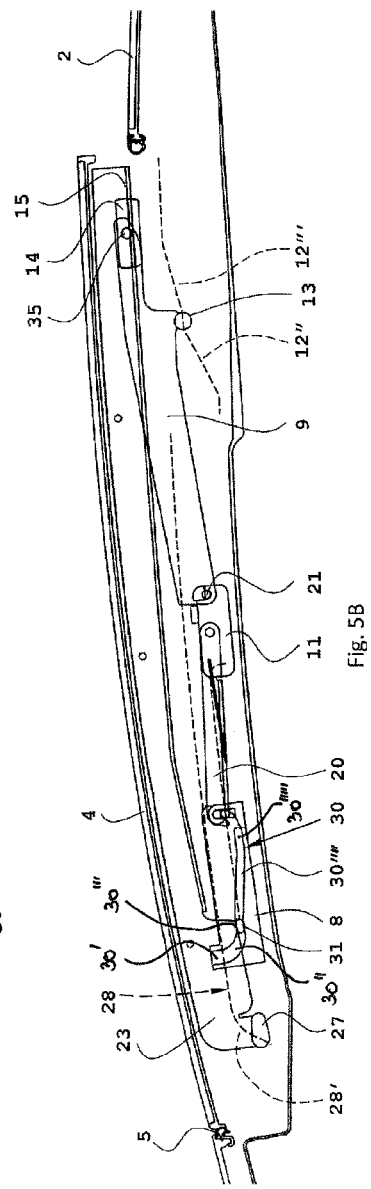

OPEN ROOF CONSTRUCTION FOR A VEHICLE

BACKGROUND

The discussion below is merely provided for general background information and is not intended to be used as an aid in determining the scope of the claimed subject matter.

Aspects of the present invention relate to an open roof construction for a vehicle having an opening in a fixed roof thereof. The open roof construction includes a stationary part for attachment to the fixed roof, having at least one guide rail on a side of the roof opening. A closure element is supported by an operating mechanism and adjustable between a closed position, in which it closes the roof opening, and an open position in which the panel is moved rearwardly above a roof portion behind the roof opening. The operating mechanism comprises a driving slide, slidably guided in the guide rail, a front support attached to the closure element and guided by the guide rail, a support lever having a front end and a rear end and which is slidably connected to a panel track of the closure element by means of a rear sliding member at the rear end of the support lever. A curve part on the stationary part includes a rear guide track having a vertical component. The support lever is in engagement with said rear guide track by means of a middle sliding member, wherein the driving slide is adapted to drive the support lever at least along part of path of movement of the closure element between the open and closed positions.

Such open roof construction is known in the prior art. There is a tendency in the automotive industry to require open roof constructions to have a panel that can be moved rearwardly to an increasingly larger extent. Of course, the biggest opening can be obtained by so-called top slider roofs having roof guide rails behind the roof opening, but it is not always possible or desirable to have such roof guide rails. To obtain a bigger opening percentage in spoiler roofs having no roof guide rails, the so-called extended slider roof has been developed, in which the panel can be slid with respect to the rear support. This sliding movement takes place when the rear support, such as a support lever, has reached its rearmost position near the rear edge of the roof opening. The maximum sliding movement is mainly limited by the stability of the panel support.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

An open roof construction of the type described above includes a support lever that is constructed such that, in the open position of the closure element, the rear sliding member at the rear end of the support lever extends above the fixed roof portion behind the roof opening.

The fact that the rear sliding member of the support lever can support the panel rearwardly of the roof opening increases the stability of the panel support, thus the panel can be moved further rearward while maintaining the same level of stability by the panel support.

If the support lever has a front end which is provided with a front sliding member engaging a front guide track of the guide rail, it is favorable if the ratio of the distance between the rear sliding member and the middle sliding member and the distance between the middle sliding member and the front sliding member, when measured parallel to the guide rail, is less than 0.9.

By having such a relatively low ratio, e.g. obtained by providing a relatively long lever, the leverage of the support lever is relatively small and therefore the stability relatively high.

Even better stability can be obtained if the ratio is less than 0.5 and preferably between 0.4 and about 0.25. With a certain ratio, it is favorable if the lever is relatively long as the longer it is in a forward direction, the longer it can be in a rearward direction as well. Of course, lengthening the lever in the rearward direction beyond the middle sliding member means that bending forces on the support lever become larger and the lever must then be made heavier, so this lengthening is limited. The distance between the center of gravity of the closure element and the rear sliding member of the support lever is also limited because if the distance becomes too large the closure element will bend too much under dynamic forces.

The support lever may be constructed such that, in the open position of the closure element, the middle sliding member is positioned just in front of the rear edge of the roof opening, as this minimizes the leverage and decreases bending of the support lever by the forces from the closure element.

Such maximally rearward positioning of the middle sliding member can be obtained if the support lever is constructed such that, in the open position of the closure element, a lower side of the lever extends substantially vertically at a position behind the middle sliding member.

With such small leverage, it might be difficult to obtain sufficient lifting of the panel by the support lever without having to increase the building height of the operating mechanism, but such lifting can be improved by having the front guide track extending at least partly rearwardly and downwardly, the rear guide track extending at least partly rearwardly and upwardly.

Using such front guide track for the front sliding member of the support lever does not increase the building height if it does not exceed the already present rear guide track. The front guide track improves the lifting capability of the support lever because the downward movement of the front end of the support lever causes a rotation of the support lever and thus an (additional) upward lifting movement of the rear end of the support lever.

The driving slide and the guide track of the curve part are preferably laterally offset, such that the driving slide is slidable to a most rearward position in which it at least partly overlaps with the guide track of the curve part, such that a rear end of the driving slide is rearwardly of a front end of the guide track of the curve part.

The rearward movement of the driving slide is thus not restricted by the guide track of the curve part, so that this is not a limiting factor in obtaining a large rearward movement of the panel.

Preferably, the driving slide is connected directly to the front support, so that the driving slide can obtain a front position which is relatively far forward, maximizing the travel of the driving slide.

The driving slide is connected to the support lever by means of a connecting element, wherein preferably both the connecting element and the support lever are pivotally connected to the front sliding member. Such sliding member does not have to be rotatable in the front guide track and can therefore be guided in a very stable manner in the front guide track.

The open roof construction may be of the type in which the closure element is first tilted from the closed position to an inclined venting position and then moved rearwardly above the fixed roof, and then the support lever is preferably slidable with respect to the closure element when the closure element is tilted between the closed and venting positions and/or the closure element is slidable with respect to the support lever when the support lever is in its most rearward position.

The invention is also useful in so-called top-loaded open roof constructions for a vehicle having an opening in the fixed roof comprising a stationary part fitting downwardly through the roof opening into a mounting position for attachment to the fixed roof and having at least one guide rail on a side of the roof opening extending between a front and rear edge of the roof opening.

BRIEF DESCRIPTION OF THE DRAWINGS

Aspects of the invention will be elucidated hereafter with reference to the drawings showing embodiments of the open roof construction.

FIGS. 5A-5D are longitudinal sectional views of the closure element and its operating mechanism in 4 different positions.

DETAILED DESCRIPTION OF THE ILLUSTRATIVE EMBODIMENTS

Figure 1:
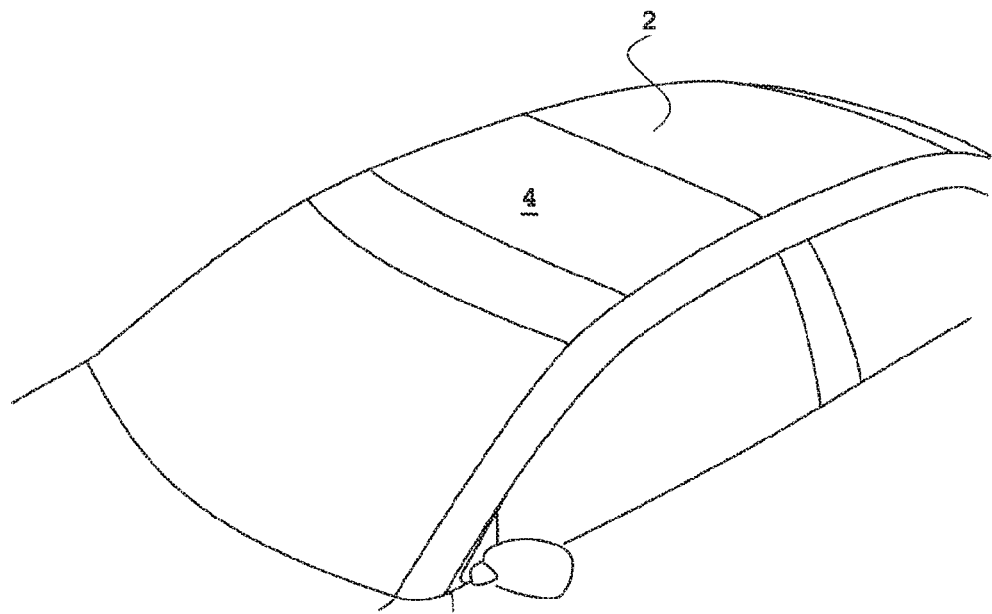
FIGS. 1 and 2 are perspective views of a vehicle roof comprising an open roof construction shown in closed and open condition, respectively.
Figure 2:
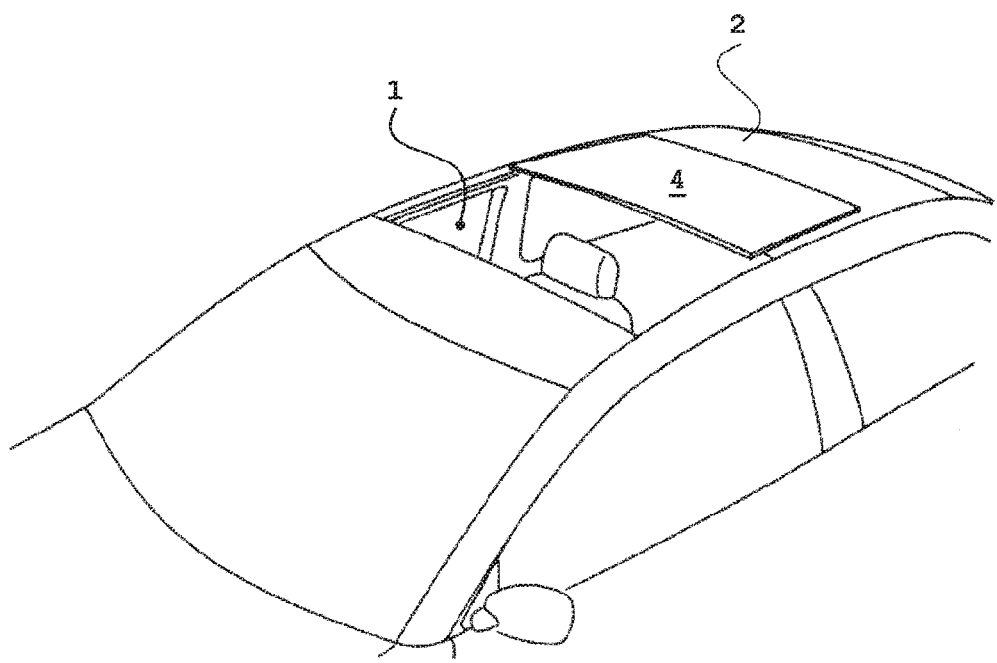

The drawings, in particular FIGS. 1-6, show an embodiment of an open roof construction for a vehicle, in particular a motor vehicle such as a passenger car. As is shown in FIG. 2, this vehicle is provided with an opening 1 in its fixed roof 2, whereby it is noted that said fixed roof 2 may either form part of the vehicle or of the open roof construction itself, which in that case makes up the entire roof of the vehicle. The fixed roof 2 may consist of an integral part of the vehicle or of one or more (transparent) panels, which may be removable or form a separate adjustable roof element.

The open roof construction comprises a stationary part, such as a frame 3 (FIG. 5), and a closure element, in this case in the form of a rigid and preferably transparent panel 4, for example made of glass or of plastic material, which is movably supported by frame 3. In this embodiment, panel 4 is movable between a closed position (FIG. 1), in which roof opening 1 is closed and panel 4 is at least substantially coplanar with fixed roof 2, and an open position (FIG. 2), in which panel 4 occupies a rearward position, at least partially above fixed roof 2, in which a large part of opening 1 is cleared. In the embodiment shown, panel 4 is first tilted to a venting position in which the rear edge of panel 4 is moved upwardly, and then moved rearwardly to positions above fixed roof 2. FIG. 5 show seal 5 on the edge of roof opening 1 to cooperate with the outer edge of the glass of panel 4. Additionally or alternatively, seals may be provided on frame 3 to cooperate with the lower side of the glass of panel 4.

Figure 3:
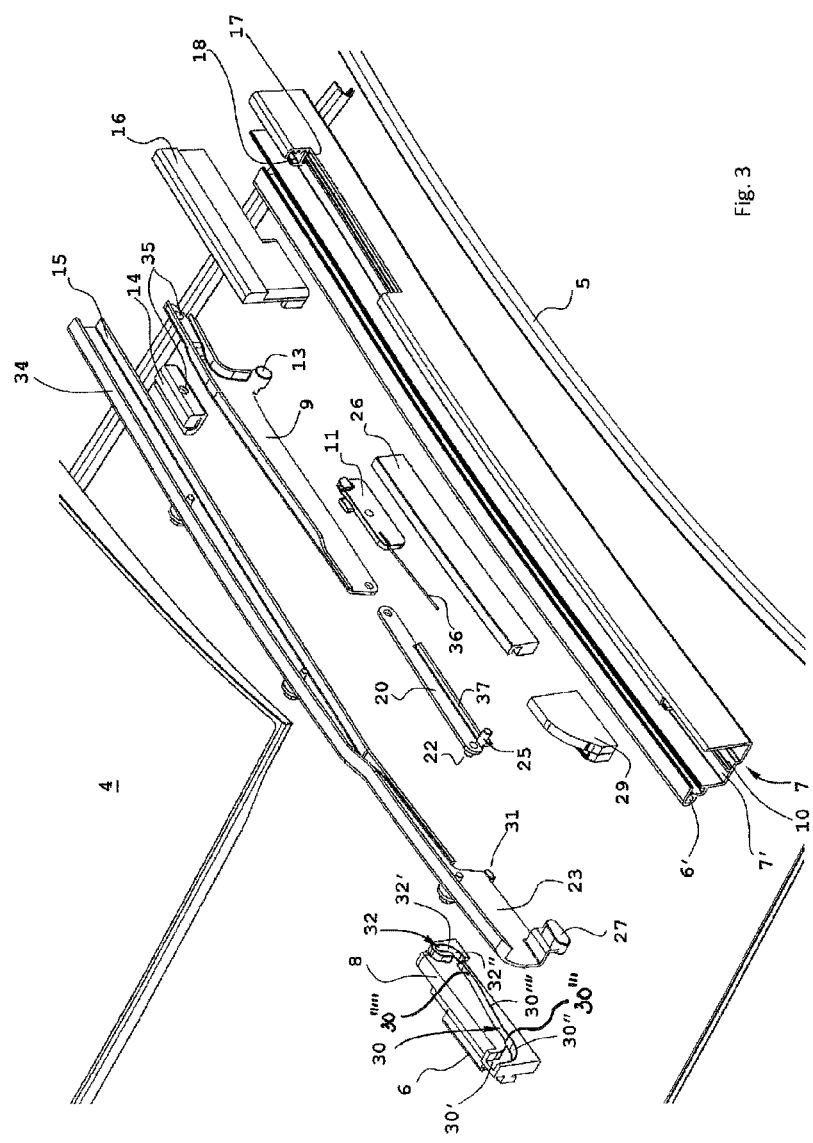
FIGS. 3, 4 are perspective exploded views of the closure element and parts of the operating mechanism on one side of the closure element, as seen from two different viewing angles.
Figure 4:
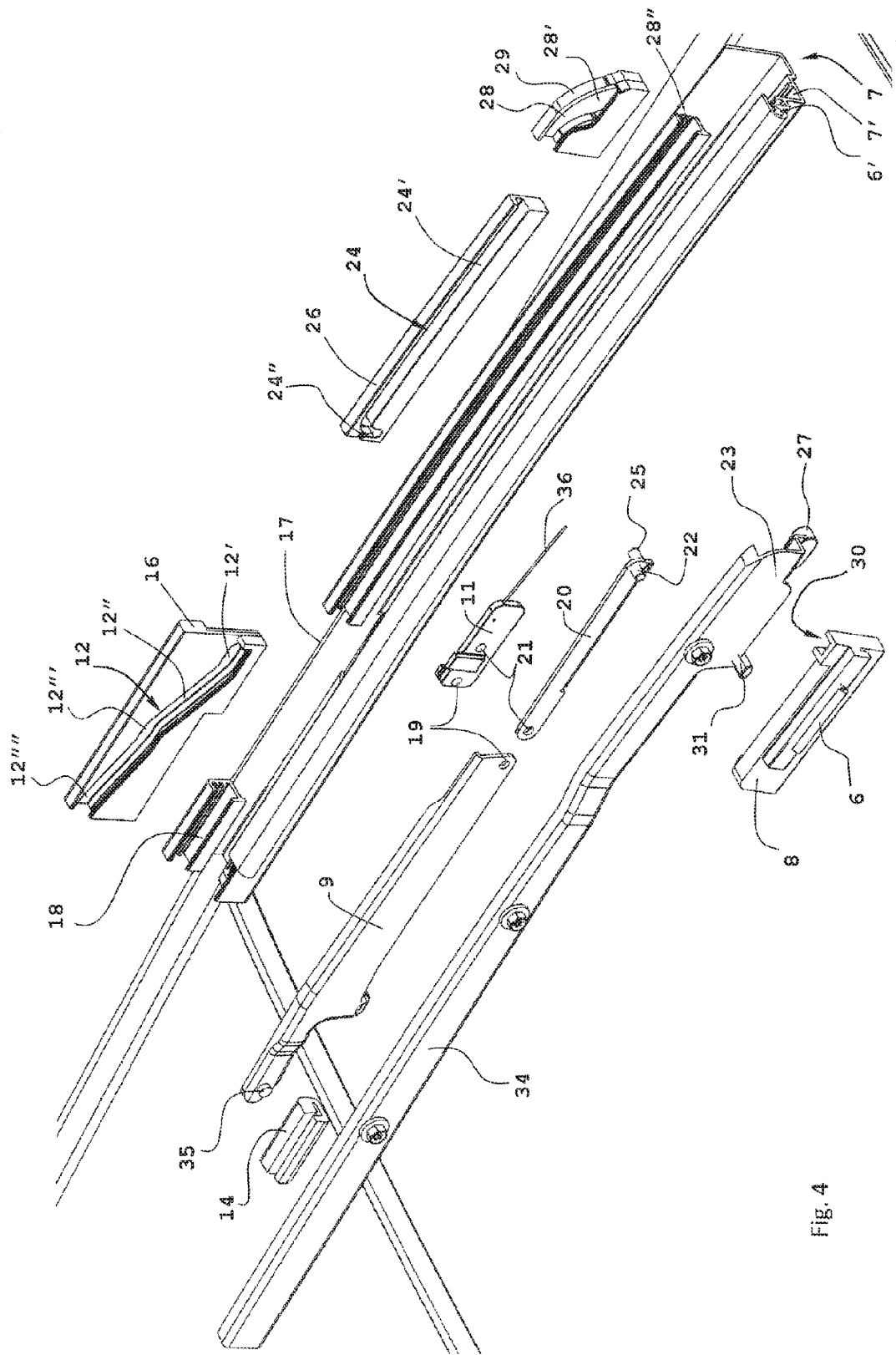

An operating mechanism is provided on each longitudinal side of panel 4 for effecting the movements of panel 4. The drawings show only parts on one side of the roof, but it should be kept in mind that similar parts are arranged in mirror image on the other side as well. The mechanism is driven by a drive unit including a drive element, such as a drive cable (a connecting part 6 and a cable guide 6' is shown in FIGS. 3 and 4) and a manual actuator, such as a crank, or a motor such as an electric motor, for driving the cable. The operating mechanism supports panel 4 and is at least partially guided in a guide rail 7 (see FIG. 3, 4), which forms part of or is mounted on frame 3. The guide rail 7 extends along the side edge of roof opening 1, at a lower level than fixed roof 2. The frame 3 is such that the open roof construction can be mounted to the fixed roof 2 by lowering it, generally in substantially vertical sense, through the roof opening 1 onto mounts of the fixed roof 2, so that the frame 3 can be attached there by fixing means once it is in position. In position, each guide rail 7 extends from a position just behind a front edge of the roof opening 1 to a position just in front of a rear edge of roof opening 1.

The guide rail 7 slidably receives a driving slide 8 which is engaged by the drive cable 6 in cable guide 6' so as to adjust panel 4. For this purpose driving slide 8 is connected, at least during a part of the movements of panel 4, to a support lever 9 which supports panel 4 and which is slidably guided at its front end in a front guide track 10 by means of a front sliding member 11 and at a middle portion in a rear guide track 12 by means of a middle sliding member 13. In this case guide tracks 10, 12 are in the form of a slot or groove and middle sliding member 13 is in the form of a pin engaging into the slot, but other track/slide shoe combinations are conceivable. The rear end of support lever 9 is provided with a rear sliding member 14 slidably engaging a panel guide track 15 of panel 4, so that panel 4 and support lever 9 may slide relatively.

The rear guide track 12 is provided on a curve part 16 which is positioned in a cut-out 17 of each guide rail 7 at a distance from the rear end of guide rail 7. The rear guide track 12 comprises a short front portion 12' substantially parallel to guide rail 7, a rearwardly connected, rearwardly and upwardly inclined portion 12", a very short parallel and then upwardly inclined portion 12''' and then a substantially parallel portion 12''''. This rear portion has an open rear end communicating with a groove 18 in guide 7 rail so that the middle sliding member 13 of support lever 9 is partly guided by guide rail 7 forming a part of rear guide track 12.

The front sliding member 11 in this case is formed by a separate element to which the front end of support lever 9 is pivotally connected through a pivot pin 19. As mentioned before the driving slide 8 is connected to support lever 9 and in this embodiment, driving slide 8 is connected to front sliding member 11 through a connecting element 20, which is pivotally connected to front sliding member 11 and is connected to driving slide 8 through pivot pins 21, 22, respectively extending horizontally in transverse direction. Front sliding member 11 has several sliding surfaces cooperating with sliding surfaces of guide rail 7 in order to be firmly guided.

The driving slide 8 does not drive support lever 9 during all movements of panel 4. In this embodiment, driving slide 8 drives support lever 9 during movements of panel 4 from the closed position to the venting position and a first part of a rearward sliding movement of panel 4. As support lever 9 has reached its rearmost position in rear guide track 12, driving slide 8 will be decoupled from connecting element 20 and will be immovably coupled to a front support 23 of panel 4.

The coupling between pivot 22 of connecting element 20 and driving slide 8 is formed by a curved slot 32, consisting of a substantially vertical rear locking portion 32' and a front portion 32" extending substantially parallel to guide rail 7 and having an open front end. The rear locking portion 32' of driving slide slot 32 extends to a position corresponding in height to a long parallel portion 24' of a guide rail slot 24 with which a pin 25 of connecting element 20 is in engagement to lock pivot 22 in locking portion 32'. A downward locking portion 24" of guide rail slot 24 allows pivot 22 to move downwards to a position in which pivot 22 of connecting element 20 is free to move in front portion 32" of driving slide slot 32 of driving slide 8 and in which pin 25 is locked in locking portion 24" of guide rail slot 24 and thus locked with respect to guide rail 7. Consequently, support lever 9 remains stationary when driving slide 8 moves further rearwardly. In order to keep pin 25 locked in locking portion 24" of guide rail slot 24, front sliding member 11 is provided with a rod spring 36 pressing on top of a rib 37 (FIG. 3) laterally projecting from connecting element 20, thereby urging connecting element in downward direction. The guide rail slot 24 is formed in a plastic insert 26 in guide rail 7 (FIG. 4).

The guide rails 7 extend so far rearwardly parallel to the longitudinal curvature of fixed roof 2, that it extends beyond the front end of rear guide track 12 (but preferably not beyond the rear edge of roof opening 1 so that the open roof construction could be mounted as a top-loader from above through roof opening 1, if desired). Therefore, a groove 7' in guide rail 7 for driving slide 8 and guide track 12 should be offset, so that groove 7' of guide rail 7 and guide track 12 can extend alongside each other (see e.g. FIGS. 3, 4).

The front support 23 is provided with a slide shoe 27 (FIGS. 3, 4) which is pivotally and slidably guided in a guide track 28 of guide rail 7. This guide track 28 has a rearwardly and upwardly inclining, short front portion 28' (formed in a plastic insert 29) and a long rear portion 28" parallel to guide rail 7 (in fact it is formed by a groove in guide rail 7). The driving slide 8 is in engagement with front support 23 by means of a pin-slot connection. In this case, a slot or curve 30 is formed in driving slide 8 and a pin 31 is formed on front support 23 rearwardly spaced from front support slide shoe 27. The slot 30 in driving slide 8 comprises an upward front locking portion 30', a rearward bend 30" at the bottom end of locking portion 30', and then a parallel (to guide rail 7) portion 30''', a downwardly and rearwardly inclined portion 30'''' and a parallel rear portion 30'''''.

The support lever 9 is pivotally and slidably connected to panel 4 by means of the rear sliding member 14 and the panel track 15, here in the form of a lateral flange, extending from a bracket 34 below the glass panel and parallel thereto. The support lever 9 is pivotally connected to the slider through a pivot 35. The rear sliding member 14 is provided with a plurality of sliding surfaces (FIG. 3, 4) fully enclosing panel track 15 in a very stable manner, allowing support lever 9 to slide with respect to panel 4 with reduced risk of slanting or other unwanted movements, when support lever 9 is driven by driving slide 8 to move panel 4 to the venting position. It also allows panel 4 to slide with respect to support lever 9 when support lever 9 is locked to guide rail 7 and panel 4 is driven by driving slide 8 through front support 23.

The operation of the operating mechanism of panel 4 will now be described with reference to FIGS. 5A-5D.

In FIG. 5A panel 4 is in the closed position. The driving slide 8 is in its front position. The pivot 22 of connecting element 20 is locked in locking portion 32' of driving slide slot 32, whereas pin 31 of front support 23 is positioned at the rear end of slot 30 in driving slide 8 (in slot portion 30'''''). The slide shoe 27 of front support 23 is positioned in the downward end of inclined front portion 28' of guide track 28 (represented by a dashed line in FIG. 5). The front sliding member 11 is at the front end of front guide track 10 (not shown), middle sliding member 13 of support lever 9 is in engagement with front end portion 12' of rear guide track 12 (also represented by a dashed line) and rear sliding member 14 of support lever 9 is in a position between the ends of panel track 15.

In the position of FIG. 5B, driving slide 8 is moved a distance rearwardly and panel 4 is pivoted to the venting position in which the rear edge of panel 4 is lifted. The support lever 9 is displaced as a unit together with driving slide 8 due to the connection by connecting element 20, thereby urging support lever 9 to slide along front and rear guide tracks 10, 12 and panel track 15. Depending on the shape and direction of rear guide track 12, the rear side of panel 4 will be lifted by support lever 9, in particularly when it is moved along inclined portion 12" of guide track 12 which extends under an angle with respect to stationary guide rail 7. The support lever 9 is allowed to pivot with respect to front sliding member 11 through pivot 21 and with respect to rear sliding member 14 through pivot 35 in order to allow support lever 9 to move in a vertical direction when panel 4 is tilted. The middle sliding member 13 has reached the very short parallel portion 12''' in guide track 12.

When driving slide 8 is moved rearwardly while front support slide shoe 27 is almost stationary in longitudinal direction due to the engagement of slide shoe 27 in inclined portion 28' of guide track 28, slot 30 in driving slide 8 will move with respect to pin 31 on front support 23, so this will slide through slot 30 towards the front side of it. Slot 30 inclines upwardly in portion 30'''', and as a result, slide shoe 27 of front support 23 will be lifted in inclined portion 28' of guide track 28. Due to this inclination of front portion 28' slide shoe 27 is displaced not only upwardly, but also slightly rearwardly. The front side of panel 4 is hence moved away from seal 5 at the front edge of roof opening 1. In FIG. 5B, pin 31 has arrived in slot portion 30''')

Figure 5C:
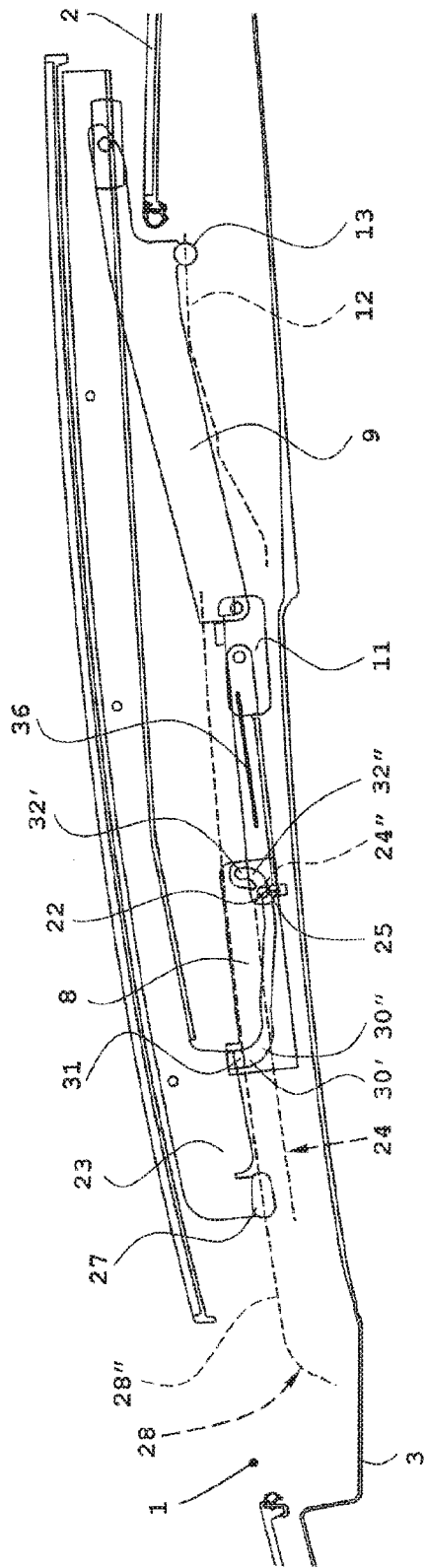

In the position of FIG. 5C, middle sliding member 13 of support lever 9 has reached its most rearward position in guide track 12. The pin 25 of connecting element 20 has reached downward locking portion 24" of guide rail slot 24 (represented by a dashed line) so that pivot pin 22 of connecting element 20 can move downwardly out of locking portion 32' of driving slide 8. As soon as pivot pin 22 has arrived in parallel portion 32" of slot 32 driving slide 8 can move relative to pivot pin 22 and pin 22 can leave slot 32. The connecting element 20 and therefore support lever 9 are locked with respect to guide rail 7 due to the engagement of pin 25 in locking portion 24" of guide rail slot 24, where it is held by rod spring 36 on front sliding member 11 urging connecting element 20 downwardly.

At the same time, pin 31 of front support 23 has arrived through bend 30" in vertical locking portion 30' of slot 30 in driving slide 8, so that pin 31 and therefore front support 23 are locked with respect to driving slide 8. As front support slide shoe 27 has arrived in parallel portion 28" of guide track 28, front support 23 is able to follow further rearward movements of driving slide 8, and pin 31 is prevented from moving downwardly in locking portion 30' of slot 30 in driving slide 8.

Figure 5D:
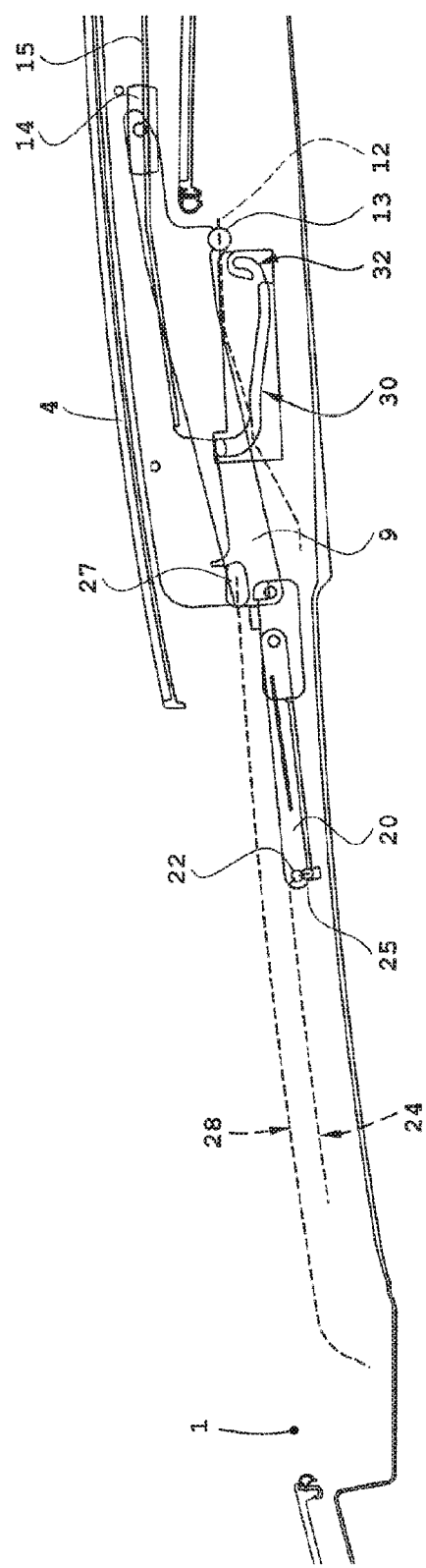

FIG. 5D shows that during this further rearward movement, panel 4 slides relative to support lever 9 due to panel track 15 sliding along support lever rear sliding member 14. The panel 4 can thus be moved further rearward and roof opening 1 can be opened to a large extent, without having to extend rear guide track 12 further rearwardly beyond the rear edge of roof opening 1.

As is clear from FIG. 5D, middle sliding member 13 is very close to the rear edge of roof opening 1. This has been made possible by the shape of support lever 9. The lower side thereof extends substantially vertically behind middle sliding member 13 such that support lever 9 can allow a rear portion of support lever 9 to extend behind the rear edge of roof opening 1. In this way, panel 4 can be supported by rear sliding member 14 of support lever 9 at a position which is relatively far rearwardly allowing a further rearward movement of panel 4 without jeopardizing the stability of the panel support. The part of support lever 9 behind middle sliding member 13 has a reduced height, and one or more stiffening ribs may increase the bending resistance of this part.

As support lever 9 is also long in forward direction, the leverage force on middle support 13 is relatively low. The relatively long rearward displacement of panel 4 is also made possible by the long groove 7' of guide rail 7 allowing driving slide to move from a forward position close to the front end of guide rail 7 to a position near the rear end thereof, in which it is positioned next to rear guide track 12 for the middle sliding member 13 of support lever 9. In this embodiment, not only the rear end of driving slide 8, but also the front end thereof is position further rearward than the front end of rear guide track 12.

Figure 6:
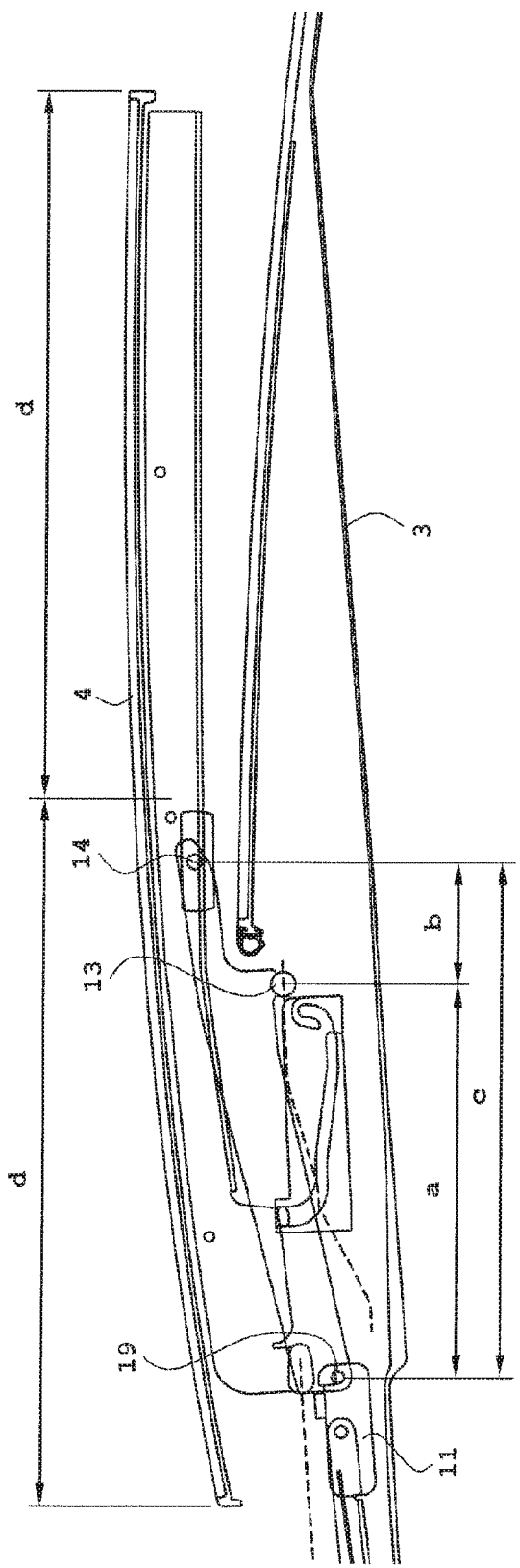
FIG. 6 is a view corresponding to that of FIG. 5D to illustrate the relative dimension of the support lever for the panel.
Figure 7A:
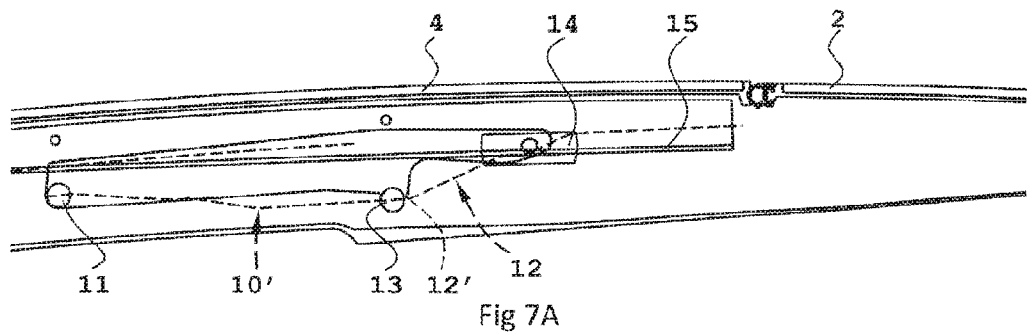
FIGS. 7A-7D are longitudinal sectional views of a rear portion of the panel and its operating mechanism in a slightly different embodiment, in 4 different positions corresponding to those of FIG. 5.
Figure 7B:
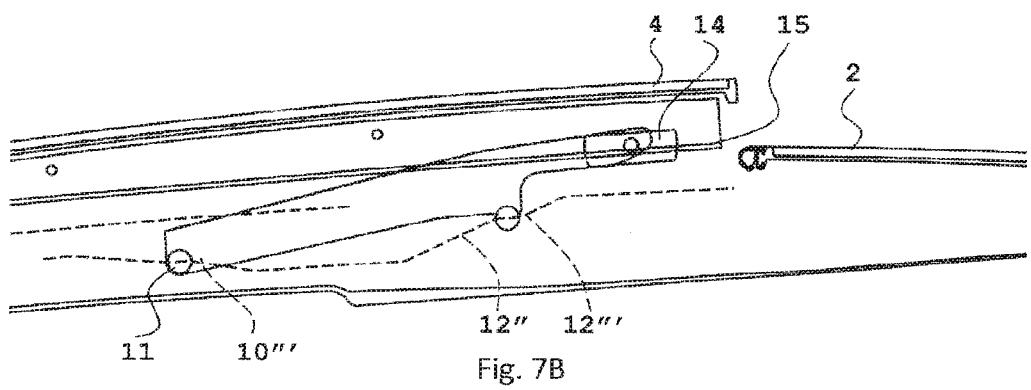
Figure 7C:
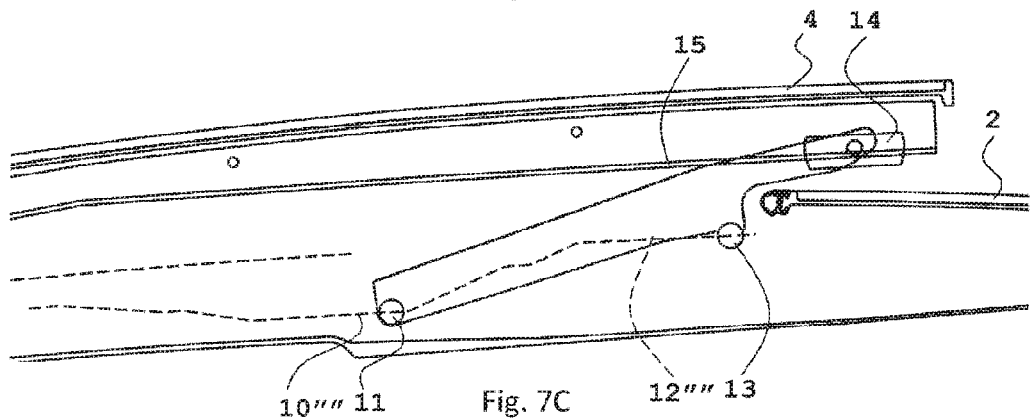
Figure 7D:
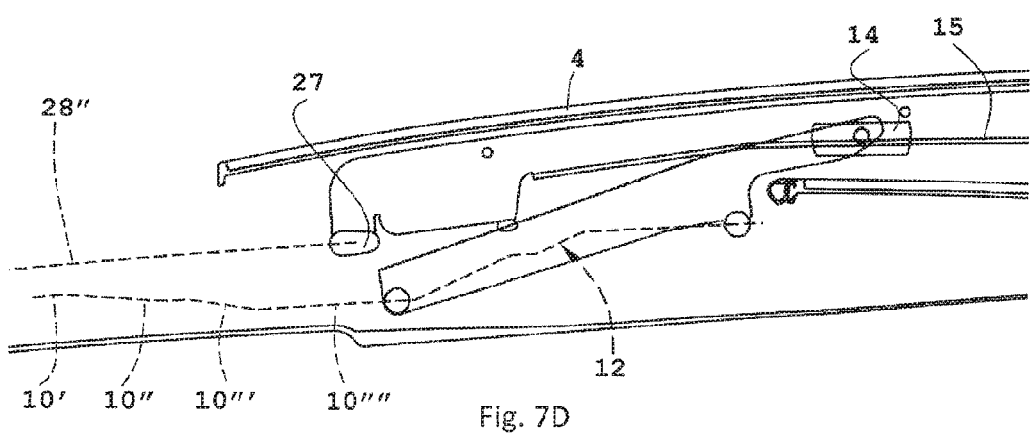

As shown in FIG. 6, in the embodiment shown, the ratio of the distance b between the (center of) rear sliding member 14 and the middle sliding member 13 and the distance a between the middle sliding member 13 and pivot 19 of front sliding member 11, when measured parallel to the guide rail 7, is about 0.3, so the leverage is relatively low. It is further shown in this FIG. 6 that more than half of panel 4 (length d) is behind rear sliding member 14 of support lever 9, so that the center of gravity of panel 4 is behind rear sliding member 14. The distance (the center of) rear sliding member 14 is positioned behind the rear edge of roof opening 1 is slightly less than distance b. The length c of support lever 9 is slightly shorter than length d of half of panel 4.

Closing of panel 4 is effected by displacing driving slide 8 in the forward direction again. The different movements as described before are performed in opposite direction and in the reversed order.

FIGS. 7A-7D shows an alternative embodiment, in which the front sliding member 11 of support lever 9 is guided in the front guide track 10, having in this embodiment a short front portion 10' substantially parallel to guide rail 7, a rearwardly connected, rearwardly and downwardly inclined portion 10", a very short parallel and then downwardly inclined portion 10''' and finally a longer substantially parallel portion 10''''. The front and rear guide tracks 10, 12 may connect to each other and may partly overlap, i.e. share a common portion. The advantage of this embodiment is that the downward movement of front sliding member 11 (in this embodiment a sliding pin) in front guide track 10 causes an additional rotation of support lever 9 leading a lifting movement of rear sliding member 14 and therefore of the rear side of panel 4, so that a higher lifting movement of panel 4 can be created without having to make rear guide track 12 higher (or even making it lower if the lift is kept constant) which is favorable for the package height of the operating mechanism.

From the foregoing it will be clear that the invention provides a very stable support for the panel and allows a large sliding movement of the panel through controllable large driving slide displacements. The operating mechanism may either be positioned in the dry or wet portion of the open roof construction. If all panel operating mechanism parts are arranged in the wet portion this could maximize the rearward displacement guide rail length if there is an inner seal on the frame cooperating with the lower side of the glass of panel 4.

The invention is not limited to the embodiment shown in the drawing and described above which may be varied in different manners within the scope of the appended claims. For example, movable connections may be replaced by other engagements between a track or curve and a sliding or rolling member. Slide shoe and sliding member have a broad meaning, i.e. any part that may slide with respect to a track or rail.

What is claimed is:

1. An open roof construction for a vehicle having a roof opening in a fixed roof, comprising:
   a stationary part for attachment to the fixed roof, having at least one guide rail on a side of the roof opening;
   an operating mechanism;
   a closure element supported by the operating mechanism and adjustable between a closed position, in which it closes the roof opening, and an open position in which the closure element is moved rearwardly above a roof portion of the fixed roof behind the roof opening, wherein the operating mechanism comprises a driving slide, slidably guided in the guide rail, a front support attached to the closure element and guided by the guide rail, a support lever having a front end and a rear end and which is slidably connected to a panel track of the closure element by a rear sliding member at the rear end of the support lever, and a curve part on the stationary part including a rear guide track having a vertical component, the support lever being in engagement with said rear guide track by a middle sliding member, wherein the driving slide is configured to drive the support lever at least along part of path of movement of the closure element between the open and closed positions, wherein the support lever is constructed such that, in the open position of the closure element, the rear sliding member at the rear end of the support lever extends above the fixed roof behind the roof opening, wherein the driving slide is connected directly to the front support, and wherein the front support of the closure element is provided with a front slide shoe which is guided in a curved slot of the guide rail, the driving slide being drivably engaged with the front support through engagement between a sliding member and a movable guide curve, the shapes of the curved slot and movable guide curve are such that the driving slide moves with respect to a substantially stationary front slide shoe when the closure element is tilted between the closed and venting positions, while the driving slide and the front support move as a unit when the closure element is moved between the venting and open positions.

2. The open roof construction according to claim 1 wherein the stationary part is sized to fit downwardly through the roof opening into a mounting position for attachment to the fixed roof, the at least one guide rail extending between a front and rear edge of the roof opening.

3. The open roof construction according to claim 1 wherein the support lever has a front end provided with a front sliding member engaging a front guide track of the guide rail, wherein a ratio of a distance between the rear sliding member and the middle sliding member and a distance between the middle sliding member and the front sliding member, when measured parallel to the guide rail, is less than 0.9.

4. An open roof construction for a vehicle having a roof opening in a fixed roof, comprising:
   a stationary part for attachment to the fixed roof, having at least one guide rail on a side of the roof opening;
   an operating mechanism;
   a closure element supported by the operating mechanism and adjustable between a closed position, in which it closes the roof opening, and an open position in which the closure element is moved rearwardly above a roof portion of the fixed roof behind the roof opening, wherein the operating mechanism comprises a driving slide, slidably guided in the guide rail, a front support attached to the closure element and guided by the guide rail, a support lever having a front end and a rear end and which is slidably connected to a panel track of the closure element by a rear sliding member at the rear end of the support lever, and a curve part on the stationary part including a rear guide track having a vertical component, the support lever being in engagement with said rear guide track by a middle sliding member, wherein the driving slide is configured to drive the support lever at least along part of path of movement of the closure element between the open and closed positions, wherein the support lever is constructed such that, in the open position of the closure element, the rear sliding member at the rear end of the support lever extends above the fixed roof behind the roof opening;
   wherein the driving slide is slidable to a most rearward position in which it at least partly overlaps with the rear guide track, such that at least a rear end of the driving slide is rearwardly of a front end of the rear guide track.

5. The open roof construction according to claim 4, wherein the support lever is constructed such that, in the open position of the closure element, the middle sliding member is positioned in front of a rear edge of the roof opening.

6. The open roof construction according to claim 4, wherein the support lever is constructed such that, in the open position of the closure element, a lower side of the support lever extends substantially vertically at a position behind the middle sliding member.

7. The open roof construction according to claim 4, wherein the driving slide is connected to the support lever by a connecting element.

8. The open roof construction according to claim 7, wherein the driving slide is connected to the connecting element through a coupling arrangement which couples the connecting element to the driving slide until the support lever reaches its most rearward position, and couples the connecting element to the guide rail when the closure element slides with respect to the support lever.

9. The open roof construction according to claim 4, wherein the driving slide is connected directly to the front support.

10. The open roof construction according to claim 9, wherein the front support of the closure element is provided with a front slide shoe which is guided in a curved slot of the guide rail, the driving slide being drivably engaged with the front support through engagement between a sliding member and a movable guide curve, the shapes of the curved slot and movable guide curve are such that the driving slide moves with respect to a substantially stationary front slide shoe when the closure element is tilted between the closed and venting positions, while the driving slide and the front support move as a unit when the closure element is moved between the venting and open positions.

11. The open roof construction according to claim 4, wherein the open roof construction is of the type in which the closure element is first tilted from the closed position to an inclined venting position and then moved rearwardly above the fixed roof.

12. The open roof construction according to claim 11, wherein the support lever is slidable with respect to the closure element when the closure element is tilted between the closed and venting positions and/or the closure element is slidable with respect to the support lever when the support lever is in its most rearward position.

13. The open roof construction according to claim 4 wherein the stationary part is sized to fit downwardly through the roof opening into a mounting position for attachment to the fixed roof, the at least one guide rail extending between a front and rear edge of the roof opening.

14. The open roof construction according to claim 4 wherein the support lever has a front end provided with a front sliding member engaging a front guide track of the guide rail, wherein a ratio of a distance between the rear sliding member and the middle sliding member and a distance between the middle sliding member and the front sliding member, when measured parallel to the guide rail, is less than 0.9.

15. The open roof construction according to claim 14, wherein the ratio is less than 0.5.

16. The open roof construction according to claim 14, wherein the ratio is between 0.4 and about 0.25.

17. The open roof construction according to claim 14, wherein the front guide track extends at least partly rearwardly and downwardly whereas the rear guide track extends at least partly rearwardly and upwardly.

18. The open roof construction according to claim 14, wherein the driving slide is connected to the support lever by a connecting element, wherein both the connecting element and the support lever are pivotally connected to the front sliding member.

19. An open roof construction for a vehicle having a roof opening in a fixed roof, comprising:
   a stationary part for attachment to the fixed roof, having at least one guide rail on a side of the roof opening;
   an operating mechanism;
   a closure element supported by the operating mechanism and adjustable between a closed position, in which it closes the roof opening, and an open position in which the closure element is moved rearwardly above a roof portion of the fixed roof behind the roof opening, wherein the operating mechanism comprises a driving slide, slidably guided in the guide rail, a front support attached to the closure element and guided by the guide rail, a support lever having a front end and a rear end and which is slidably connected to a panel track of the closure element by a rear sliding member at the rear end of the support lever, and a curve part on the stationary part including a rear guide track having a vertical component, the support lever being in engagement with said rear guide track by a middle sliding member, wherein the driving slide is configured to drive the support lever at least along part of path of movement of the closure element between the open and closed positions, wherein the support lever is constructed such that, in the open position of the closure element, the rear sliding member at the rear end of the support lever extends above the fixed roof behind the roof opening, wherein the driving slide is connected to the support lever by a connecting element, and wherein the driving slide is slidable to a most rearward position in which it at least partly overlaps with the rear guide track, such that at least a rear end of the driving slide is rearwardly of a front end of the rear guide track, and wherein the driving slide is connected to the connecting element through a coupling arrangement which couples the connecting element to the driving slide until the support lever reaches its most rearward position, and couples the connecting element to the guide rail when the closure element slides with respect to the support lever.

20. The open roof construction according to claim 19 wherein the stationary part is sized to fit downwardly through the roof opening into a mounting position for attachment to the fixed roof, the at least one guide rail extending between a front and rear edge of the roof opening.

\* \* \* \* \*